US012616877B2

(12) United States Patent
Ladd

(10) Patent No.: US 12,616,877 B2
(45) Date of Patent: May 5, 2026

(54) GOLF BALL COMPONENTS INCORPORATING RECLAIMED RESOURCES AND GOLF BALLS FORMED THEREFROM

(71) Applicant: Acushnet Company, Fairhaven, MA (US)

(72) Inventor: Derek A. Ladd, Acushnet, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 18/086,999

(22) Filed: Dec. 22, 2022

(65) Prior Publication Data

US 2024/0207688 A1 Jun. 27, 2024

(51) Int. Cl.
*A63B 37/06* (2006.01)
*A63B 37/00* (2006.01)
*C08K 13/08* (2006.01)

(52) U.S. Cl.
CPC .......... *A63B 37/0051* (2013.01); *C08K 13/08* (2013.01); *A63B 37/0074* (2013.01); *A63B 37/0075* (2013.01); *A63B 37/0076* (2013.01); *A63B 37/00922* (2020.08); *A63B 2209/00* (2013.01)

(58) Field of Classification Search
CPC .................................................... A63B 37/005
See application file for complete search history.

(56) References Cited

U.S. PATENT DOCUMENTS

| | | | | |
|---|---|---|---|---|
| 4,955,613 | A | * 9/1990 | Gendreau | .......... A63B 37/0023 525/193 |
| 6,677,401 | B2 | 1/2004 | Boehm et al. | |
| 6,992,135 | B2 | 1/2006 | Boehm et al. | |
| 2008/0161132 | A1 | * 7/2008 | Sullivan | ............. A63B 37/0031 473/376 |

OTHER PUBLICATIONS

U.S. Appl. No. 18/087,024, filed Dec. 22, 2022 entitled "Method of Reclaiming Resources from Golf Balls".

* cited by examiner

*Primary Examiner* — Raeann Gorden
(74) *Attorney, Agent, or Firm* — Bradley Arant Boult Cummings LLP

(57) ABSTRACT

Reclaimed resources obtained from a thermal process used to combust golf ball waste and, more specifically, inorganic reclaimed resources that include at least one metal component, compositions including such reclaimed resources, golf ball components made from such compositions, and golf balls including such golf ball components.

18 Claims, 4 Drawing Sheets

10

14

12

30

32

34

36

38

GOLF BALL COMPONENTS INCORPORATING RECLAIMED RESOURCES AND GOLF BALLS FORMED THEREFROM

FIELD OF THE INVENTION

The present disclosure relates generally to incorporating reclaimed resources into golf balls. More particularly, golf balls of the present disclosure include at least one component formed from a composition that includes resources that were obtained from a thermal process used to combust golf ball waste. The golf ball components formed with reclaimed resources may require less use of conventional additives since the reclaimed resources incorporated therein may increase reaction time, help the material band together, have more consistent weight, reduce feathering, or any combination thereof. In addition, golf balls formed in accordance with the present disclosure may be more easily discernable in x-ray processes used to identify and separate various product lines and/or ensure concentricity post-production.

BACKGROUND OF THE INVENTION

Like any other unused piece of sports equipment, golf balls that are no longer being played or playable become solid waste. Likewise, scrap materials from the production of new golf balls or golf balls that are rejected during the production process for one reason or another must be disposed of in some manner. Typically, such golf ball waste ends up being mixed with other municipal solid waste and put in landfills. It would be advantageous to use at least a portion of this waste as feedstock in new golf balls.

To date, there is no large scale method for reclaiming the inorganic metals from golf ball waste and using such reclaimed resources as raw material in the production of certain golf ball components. The present disclosure addresses compositions that include such reclaimed resources, golf ball components that include such compositions, and golf balls including such golf ball components. In this regard, the use of reclaimed resources recovered from the reclamation process may reduce the demand and/or cost of certain raw materials that are commonly used in the production of certain golf ball components.

SUMMARY OF THE INVENTION

The present disclosure is directed to a golf ball that includes: a dual core including an outer core layer disposed over an inner core layer, wherein at least one of the outer core layer or the inner core layer is formed of a composition, the composition including a base rubber; and ash residue including at least one metal compound, wherein the at least one metal compound is present in the ash residue in an amount of about 5 percent to about 30 percent by weight of the ash residue; and a cover layer surrounding the dual core, wherein the cover layer includes an ionomer, polyurethane, polyurea, polyurethane-urea hybrid, or copolymers and blends thereof.

In some aspects, the at least one metal compound includes zinc, titanium, barium, limestone, or a combination thereof. In other aspects, the ash residue includes at least two metal compounds selected from zinc, titanium, barium, and limestone. In still other aspects, the ash residue is present in the composition in an amount of about 5 to 10 percent by weight of the composition. In yet other aspects, the composition further includes an organic peroxide, a cross-linking co-agent, a radical scavenger, or a combination thereof. In one embodiment, the co-agent includes a zinc salt of an acrylate, diacrylate, methacrylate, or dimethacrylate. In some embodiments, the outer core layer is formed of the composition. In other embodiments, the base rubber includes polybutadiene.

The present disclosure also relates to a golf ball including: a core formed of a composition including: a base rubber and ash residue including at least one metal compound, wherein the ash residue is present in the composition in an amount of about 1 to 20 percent by weight of the composition, and wherein the at least one metal compound is present in the ash residue in an amount of about 10 to 25 percent by weight of the ash residue; a cover layer; and a layer disposed between the core and the cover, wherein the layer and cover each includes an ionomer, polyurethane, polyurea, polyurethane-urea hybrid, or copolymers and blends thereof.

In some embodiments, the at least one metal compound includes zinc, titanium, barium, limestone, or a combination thereof. In other embodiments, the ash residue includes zinc, titanium, and barium. In still other embodiments, the ash residue is present in the composition in an amount of about 2 to 15 percent by weight of the composition.

The present disclosure also relates to a golf ball including: a core formed of a composition including a base rubber including polybutadiene, butyl rubber, or a combination thereof and ash residue comprising at least one metal compound, wherein the ash residue is present in the composition in an amount of about 7 to 18 percent by weight of the composition, and wherein the at least one metal compound is present comprises zinc, titanium, barium, limestone, or a combination thereof; and a cover layer. In some embodiments, the golf ball also includes a layer disposed between the core and the cover, wherein the layer and cover each includes an ionomer, polyurethane, polyurea, polyurethane-urea hybrid, or copolymers and blends thereof. In other embodiments, the ash residue is present in the composition in an amount of about 2 to 15 percent by weight of the composition. In still other embodiments, the ash residue is present in the composition in an amount of about 5 to 10 percent by weight of the composition. In yet other embodiments, the at least one metal compound is present in the ash residue in an amount of about 8 to 30 percent by weight of the ash residue. In other embodiments, the at least one metal compound is present in the ash residue in an amount of about 12 to 20 percent by weight of the ash residue.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
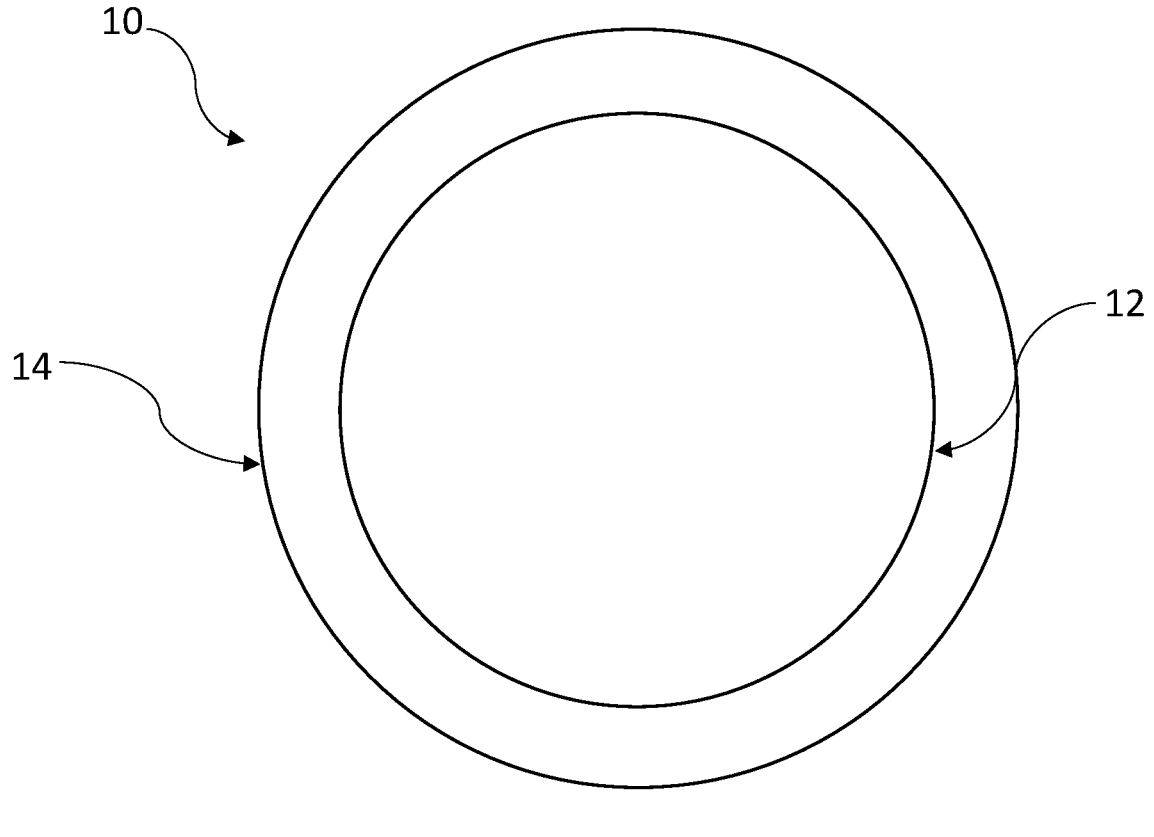
FIG. 1 is a cross-sectional view of a two-piece golf ball in accordance with an embodiment of the present disclosure.

The present disclosure relates to composition, golf ball components, and golf balls including reclaimed resources. More particularly, ash residue from a golf ball waste reclamation process may be incorporated into compositions for certain golf ball components to increase reaction time, reduce feathering, improve bonding, and/or achieve weight consistency, among other benefits. In this aspect, the ash residue may reduce the need for conventional fillers that are used for such advantageous processing conditions and properties. Moreover, golf balls that include components formed using the ash residue may be easier to identify and test through x-ray processes due to the metal components contained in the ash residue. The ash residue, composition including the ash residue, components formed from the composition including the ash residue, and golf balls including the components formed from the composition including the ash residue are discussed in more detail below.

Ash Residue

As briefly mentioned above, the reclaimed resources that are included in golf ball compositions in accordance with the present disclosure may be in the form of ash residue that has been collected from a golf ball waste reclamation process. A suitable golf ball reclamation process is disclosed in concurrently filed U.S. patent application entitled "Method of Reclaiming Resources from Golf Balls," the entire disclosure of which is incorporated by reference herein. Briefly, feedstock, which includes any golf ball, preferably spent golf balls that are at the end of their useful existence, as well as scrap rubber and rejected golf balls from the golf ball production process ("golf ball waste"), is subjected to a high temperature, dry oxidation process to reduce organic and combustible waste to organic-free ash residue. The organic-free ash residue includes at least one metal compound. For example, the ash residue may include at least one metal compound such as zinc, barium, titanium, limestone, or a combination thereof. In other embodiments, the ash residue includes at least two metal compounds. In this aspect, the ash residue may include at least two of zinc, barium, titanium, and limestone. In another embodiment, the ash residue includes at least three metal compounds, i.e., zinc, barium, and titanium, or zinc, barium, and limestone, or zinc, titanium, and limestone, etc.

The ash residue may include about 2 percent to about 8 percent metal compounds by weight of the total weight of the feedstock from which it was reclaimed. In other embodiments, the ash residue may include about 3 percent to about 7 percent metal compounds by weight of the total weight of the feedstock from which it was reclaimed. In this aspect, the ash residue may include about 2 percent to about 5 percent zinc by weight of the total weight of the feedstock from which it was reclaimed. In one embodiment, the ash residue may include about 3 percent to about 4 percent zinc by weight of the feedstock from which it was reclaimed. Similarly, the ash residue may include about 2 percent to about 5 percent barium by weight of the total weight of the feedstock from which it was reclaimed. In one embodiment, the ash residue may include about 3 percent to about 4 percent barium by weight of the feedstock from which it was reclaimed. Likewise, the ash residue may include about 1 percent to about 3 percent titanium by weight of the total weight of the feedstock from which it was reclaimed. In one embodiment, the ash residue may include about 2 percent to about 3 percent titanium by weight of the feedstock from which it was reclaimed.

In some aspects, the ash residue includes about 8 percent to about 30 percent metal compounds based on the total weight of the ash residue. In one embodiment, the ash residue includes about 10 percent to about 25 metal compounds based on the total weight of the ash residue. In another embodiment, the ash residue includes about 12 percent to about 20 percent metal compounds based on the total weight of the ash residue. For example, the ash residue may include about 13 to about 15 percent metal compounds based on the total weight of the ash residue.

In some respects, the ash residue may include about 8 percent to about 20 percent zinc by weight based on the total weight of the ash residue. In one embodiment, the ash residue may include about 10 percent to about 18 percent zinc based on the total weight of the ash residue. Similarly, the ash residue may include about 12 percent to about 15 percent zinc based on the total weight of the ash residue. In some respects, the ash residue may include about 8 percent to about 20 percent barium by weight based on the total weight of the ash residue. In one embodiment, the ash residue may include about 10 percent to about 18 percent barium based on the total weight of the ash residue. Similarly, the ash residue may include about 12 percent to about 15 percent barium based on the total weight of the ash residue. In other respects, the ash residue may include about 8 percent to about 20 percent titanium by weight based on the total weight of the ash residue. In one embodiment, the ash residue may include about 10 percent to about 18 percent titanium based on the total weight of the ash residue. Similarly, the ash residue may include about 12 percent to about 15 percent titanium based on the total weight of the ash residue.

Compositions

The present disclosure provides compositions that include the aforementioned ash residue. In some embodiments, the compositions of the present disclosure include a base rubber, such as polybutadiene, butyl rubber, or mixtures thereof, a cross-linking agent, a free radical initiator, and the ash residue.

In one embodiment, the composition includes a base rubber in an amount of about 5 percent to 100 percent by weight based on total weight of composition. In one embodiment, the base rubber is included in the composition in an amount within a range having a lower limit of about 5 percent or 10 percent or 20 percent or 30 percent or 40 percent or 50 percent and an upper limit of about 55 percent or 60 percent or 70 percent or 80 percent or 90 percent or 95 percent or 100 percent. For example, the base rubber may be present in the composition in an amount of about 40 percent to about 95 percent by weight based on the total weight of the composition. In one embodiment, the composition includes about 55 percent to about 95 percent base rubber based on the total weight of the composition.

The base rubber may be polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In one embodiment, the composition includes polybutadiene rubber, butyl rubber, or a blend thereof as the base rubber.

The composition may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimeth-acrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA).

Radical scavengers such as a halogenated organosulfur, organic disulfide, or inorganic disulfide compounds may also be added to the composition. In one embodiment, a halogenated organosulfur compound included in the composition includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the composition.

The composition may include about 1 to 20 parts by weight ash residue based on the total weight of the composition. In one embodiment, the composition includes about 2 to 15 parts by weight ash residue based on the total weight of the composition. In another embodiment, the composition includes about 5 to 10 parts by weight ash residue based on the total weight of the composition. In still another embodiment, the composition includes about 7 percent to about 18 percent by weight ash residue based on the total weight of the composition.

The composition may be cured using conventional curing processes. Non-limiting examples of curing processes suitable for use in accordance with the present invention include peroxide-curing, sulfur-curing, high-energy radiation, and combinations thereof. In one embodiment, the rubber formulation includes a free-radical initiator selected from organic peroxides, high energy radiation sources capable of generating free-radicals, and combinations thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

While rubber-based compositions are primarily discussed in this section, it is contemplated that the ash residue may be used in thermoplastic elastomer compositions as well. For example, the ash residue may be included in ionomeric compositions, polyurethane compositions, polyurea compositions, and the like.

Golf Balls

Figure 2:
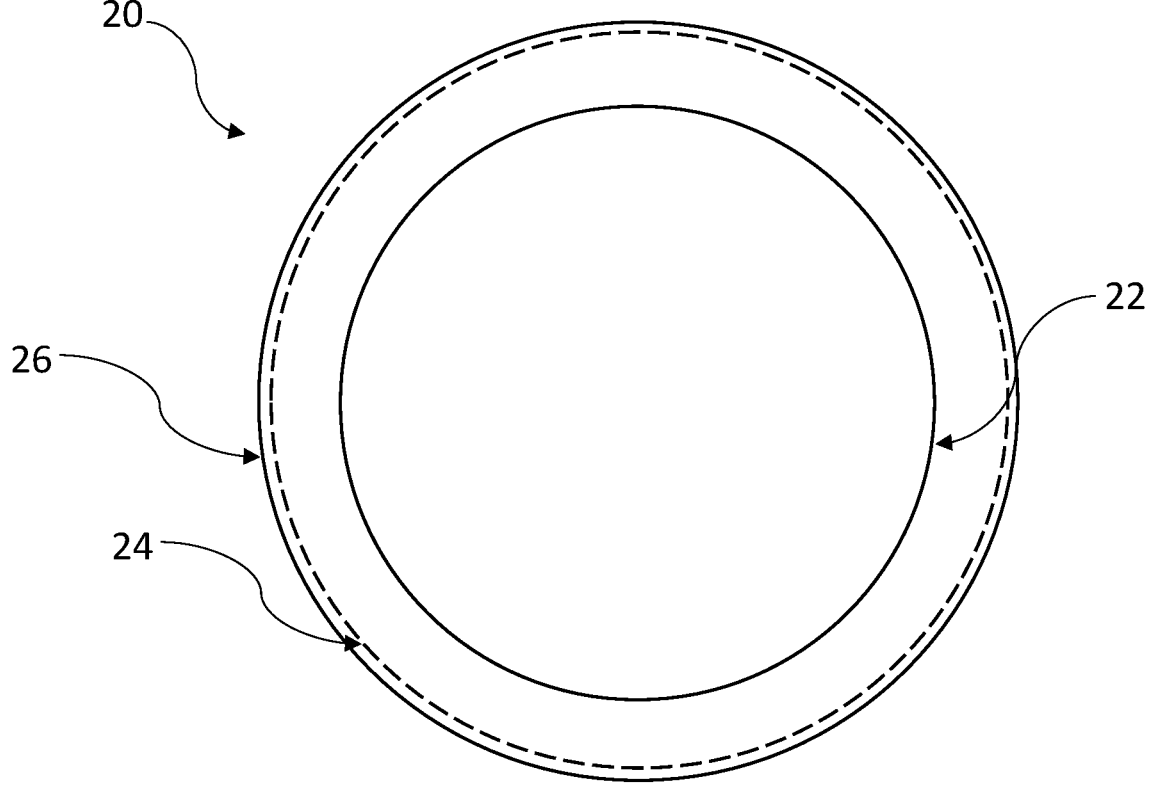
FIG. 2 is a cross-sectional view of a three-piece golf ball in accordance with an embodiment of the present disclosure.
Figure 3:
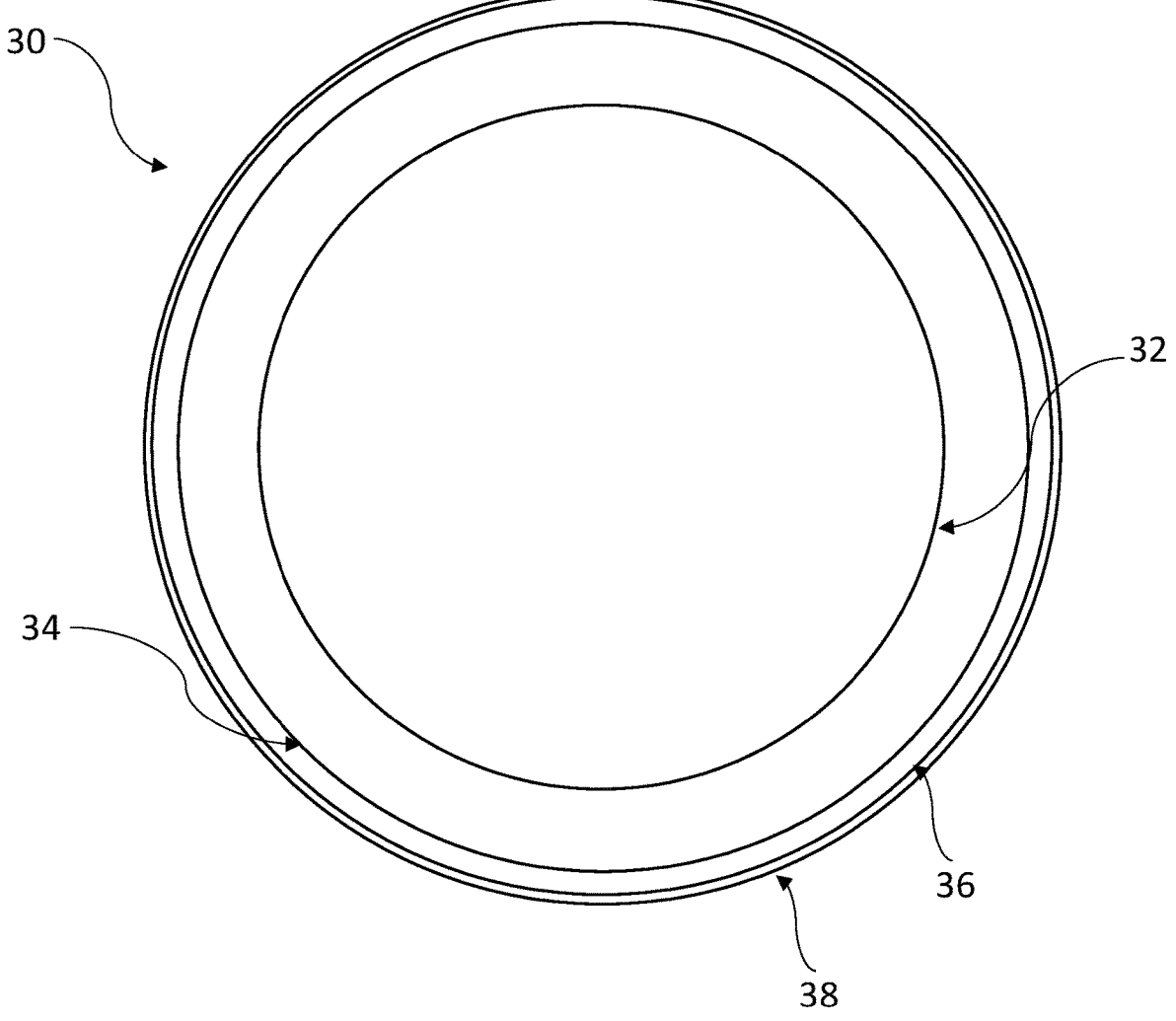
FIG. 3 is a cross-sectional view of a four-piece golf ball in accordance with an embodiment of the present disclosure.
Figure 4:
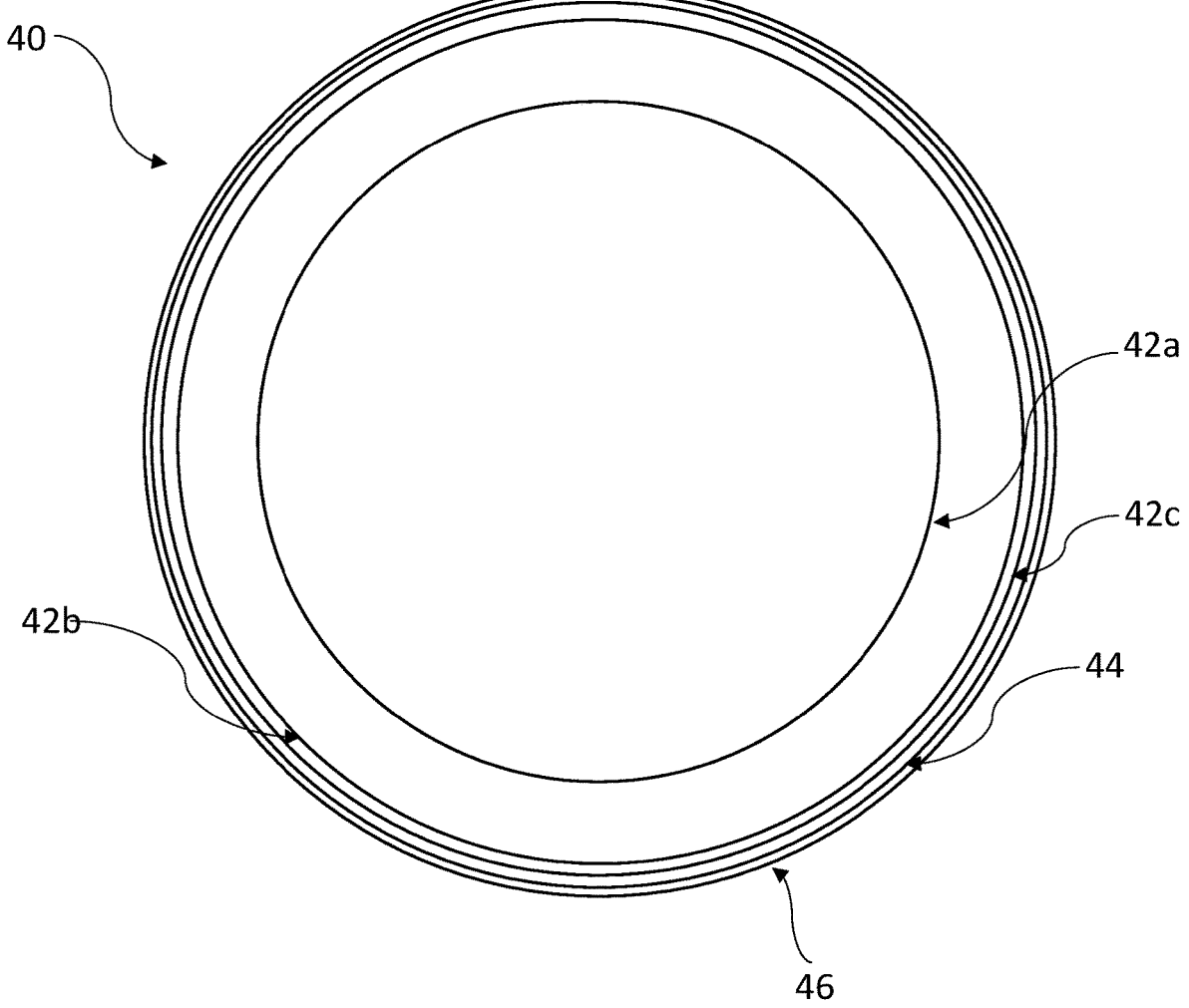
FIG. 4 is a cross-sectional view of a five-piece golf ball in accordance with an embodiment of the present disclosure.

Golf balls formed in accordance with the present disclosure include at least a core and a cover. Referring to FIG. 1, a two-piece golf ball 10 can be made in accordance with the present disclosure. The ball 10 contains a core 12 and a cover 14. In another version, as shown in FIG. 2, a three-piece golf ball 20 can be made in accordance with this invention. The ball 20 contains a core 22, a cover 26, and a layer 24 disposed between the core 22 and the cover 26. Referring to FIG. 3, in yet another version, a four-piece golf ball 30 can be made in accordance with this invention. The ball 30 contains a center 32, an outer core layer 34, a cover 38, and a layer 36 disposed between the outer core layer 34 and the cover 28. Referring to FIG. 4, in still another version, a five-piece golf ball 40 contains a core 42 including a center 42*a*, an outer core layer 42*c*, and an inner core layer 42*b* disposed between the center 42*a* and the outer core layer 42*c*, a cover 46, and a layer 44 disposed between the core 42 and the cover 46. In any of these embodiments, the layer 24, 36, and 44 may be considered an intermediate layer, casing or mantle layer, or inner cover layer, or any other layer disposed between the core assemblage and the outer cover of the ball. In any of these embodiments, the center/core 12, 22, and 32, and/or core layers 34, 42*a*, 42*b*, and 42*c* may be formed from a composition of the present disclosure.

Golf balls made in accordance with this invention can be of any size, although the USGA requires that golf balls used in competition have a diameter of at least 1.68 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches. There is no upper limit so many golf balls have an overall diameter falling within the range of about 1.68 to about 1.80 inches. In this regard, golf balls made in accordance with this invention have a diameter in the range of about 1.68 to about 1.80 inches. In one embodiment, the golf ball diameter is about 1.68 to 1.74 inches. In another embodiment, the golf ball diameter is about 1.68 to 1.70 inches. For play outside of United States Golf Association (USGA) rules, the golf balls can be of a smaller size. In one embodiment, golf balls made in accordance with this invention have a diameter in the range of about 1.68 inches or less, e.g., 1.55 inches to about 1.68 inches.

The cover of a golf ball formed in accordance with the present disclosure may be formed from a variety of materials may be used for forming the cover including, for example, polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth) acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and; cross-linked trans-polyisoprene and blends thereof; polyester-based thermoplastic elastomers; polyurethane-based thermoplastic elastomers; synthetic or natural vulcanized rubber; and combinations thereof. As briefly discussed above, a composition used to form a cover layer of a golf ball in accordance with the present disclosure may include ash residue as a filler or additive. If included, the ash residue may be present in an amount of about 1 to 20 weight percent based on the total weight of the composition.

Conventional and non-conventional materials may be used for forming layer(s) between the core and cover of the ball including, for instance, ionomer resins, highly neutralized polymers, polybutadiene, butyl rubber, and other rubber-based core formulations, and the like. In some embodiments, a composition used to form an intermediate layer of a golf ball includes about 1 to 20 weigh percent ash residue (based on the total weight of the composition).

In this aspect, ionomers suitable for use in accordance with the present disclosure may include partially neutralized ionomers and highly neutralized ionomers (HNPs), including ionomers formed from blends of two or more partially neutralized ionomers, blends of two or more highly neutralized ionomers, and blends of one or more partially neutralized ionomers with one or more highly neutralized ionomers. For purposes of the present disclosure, "HNP" refers to an acid copolymer after at least 70 percent of all acid groups present in the composition are neutralized.

Suitable ionomers may be salts of O/X- and O/X/Y-type acid copolymers, wherein O is an α-olefin, X is a $C_3$-$C_8$ α, β-ethylenically unsaturated carboxylic acid, and Y is a softening monomer. O is preferably selected from ethylene and propylene. X may be selected from methacrylic acid, acrylic acid, ethacrylic acid, crotonic acid, and itaconic acid, Y may be selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Nonlimiting examples of O/X and O/X/Y-type copolymers include ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like.

"Low acid" and "high acid" ionomeric polymers, as well as blends of such ionomers, may be used. In general, low acid ionomers are considered to be those containing 16 weight percent or less of acid moieties, whereas high acid ionomers (e.g., Surlyn® 8150) are considered to be those containing greater than 16 weight percent of acid moieties. In one embodiment, the inner cover layer is formed from a composition comprising a high acid ionomer. In another embodiment, the inner cover layer is formed from a composition comprising a high acid ionomer and a maleic anhydride-grafted non-ionomeric (e.g., Fusabond® 525D (DuPont)). Blends of high acid ionomers with maleic anhydride-grafted polymers are further disclosed, for example, in U.S. Pat. Nos. 6,992,135 and 6,677,401, the entire disclosures of which are hereby incorporated herein by reference.

Any of the layers of a golf ball formed in accordance with the present disclosure may include a variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents such as pigments and dyes, fluorescent agents, whitening agents, UV absorbers, light stabilizers, surfactants, processing aids, antioxidants, stabilizers, softening agents, chemical blowing and foaming agents, defoaming agents, fragrance components, plasticizers, wetting agents, impact modifiers, antiozonants, titanium dioxide, clay, mica, talc, glass flakes, milled glass, and mixtures thereof.

In one embodiment, the golf balls made in accordance with the present disclosure include a core formed from a composition of the present disclosure, a layer disposed on the core formed from an ionomeric material, and a cover formed from a thermoplastic elastomer composition, where the cover has a hardness that is less than that of the layer disposed between the core and the cover. For example, the layer disposed between the core and the cover may have a hardness of greater than about 60 Shore D and the cover may have a hardness of less than about 60 Shore D.

In some aspects, when the layer(s) disposed between the core and the cover is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In an alternative embodiment, the core is formed from a composition of the present disclosure, the layer disposed between the core and the cover is formed of a thermoplastic elastomeric composition, and the cover is formed of an ionomeric material. In this alternative embodiment, the layer disposed between the core and the cover may have a hardness of less than about 60 Shore D and the cover may have a hardness of greater than about 55 Shore D and the layer disposed between the core and the cover has a hardness that is less than the cover hardness. When a dual cover is disposed about the core, the layer disposed between the core and the cover may have a thickness of about 0.01 inches to about 0.1 inches, about 0.015 inches to about 0.08 inches, or about 0.02 inches to about 0.05 inches. The cover may have a thickness of about 0.015 inches to about 0.055 inches, about 0.02 inches to about 0.04 inches, or about 0.025 inches to about 0.035 inches.

The golf balls of the present disclosure may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

In one embodiment, a composition of the present disclosure is used to form the center and, optionally, one or more core layers, of a golf ball. In this aspect, additional layers may be formed over the core using any suitable technique that is associated with the material used to form the layer. Preferably, each cover layer is separately formed over the core. For example, an ethylene acid copolymer ionomer composition may be injection-molded to produce half-shells over the core. Alternatively, the ionomer composition can be placed into a compression mold and molded under sufficient pressure, temperature, and time to produce the hemispherical shells, which may then be placed around the core in a compression mold. An outer cover layer including a polyurethane or polyurea composition over the ball sub-assembly may be formed by using a casting process.

Golf balls made in accordance with the present disclosure may be subjected to finishing steps such as flash-trimming, surface-treatment, marking, coating, and the like using techniques known in the art. In one embodiment, a white-pigmented cover may be surface-treated using a suitable method such as, for example, corona, plasma, or ultraviolet (UV) light-treatment. Indicia such as trademarks, symbols, logos, letters, and the like may be printed on the cover using pad-printing, ink-jet printing, dye-sublimation, or other suitable printing methods. Clear surface coatings (for example, primer and top-coats), which may contain a fluorescent whitening agent, may be applied to the cover. Golf balls may also be painted with one or more paint coatings in a variety of colors. In one embodiment, white primer paint is applied first to the surface of the ball and then a white topcoat of paint may be applied over the primer.

Post-Production Inspection

Once formed, golf balls of the present disclosure may be subject to x-ray inspection processes for product sorting and/or post-production concentricity analysis. In this aspect, the use of the ash residue in a composition used to form one or more components of the golf ball may allow for and improve identification of particular golf balls. In particular, conventional additives are sometimes used to assist golf ball manufacturers in identifying and sorting golf balls based on the presence or absence of a layer. For example, barium sulfate may be added to an outer core layer because it improves contrast on an x-ray and allows easier identification of a golf ball with a dual core (as compared to a golf ball with a single core). Since the ash residue contains one or more metal compounds, the contrast typically achieved with additives may be achieved or improved with the use of the ash residue. In some embodiments, the use of the ash residue in a composition of the present disclosure improves contrast in an x-ray image by at least about 2 percent (as compared to the contrast achieved with the use of barium sulfate in a composition where all else is held constant). In other embodiments, a composition of the present disclosure has an improvement in contrast in an x-ray image by at least about 5 percent (as compared to the contrast achieved with the use of barium sulfate in a composition where all else is held constant).

Similarly, the ash residue in golf balls formed in accordance with the present disclosure may make it easier to inspect such golf balls for concentricity. For example, x-ray inspection may be used to image a golf ball or component thereof to calculate concentricity without destroying the golf ball or component. Such non-destructive x-ray methods generally require the use of lower energy x-rays so that the cover material can be discerned in the resulting image. But, this lower power may cause the edges of the image to become somewhat distorted or less clear. While improving the contrast of the various components of the golf ball, such as by doping or through the use of certain additives, has been employed to improve contrast between the layers and assist in cover detection, doping may alter performance characteristics of the ball. Without being bound by any particular theory, the metal compounds in the ash residue of compositions of the present disclosure may improve contrast of the component formed therefrom and, thus, improve detection of the components of the golf ball, which, in turn, facilitates and delivers a more accurate concentricity value, without affecting the performance characteristics of the ball.

In either aspect, a feeding system may be used to deliver golf balls made in accordance with the present disclosure to an inspection system. The feeding system may include a hopper with a belt feed uplift, a moving belt, or other conveyance method that transports the balls or ball components to a position that allows for performance of the inspection routine including x-ray imaging, identification of components/layers, determining thickness, diameter, and/or concentricity, sorting, or any combination thereof.

EXAMPLES

The following non-limiting example demonstrates a reclamation process in accordance with the present disclosure and subsequently tested ash. This example are merely illustrative of the preferred embodiments of the present disclosure and are not to be construed as limiting the disclosure, the scope of which is defined by the appended claims.

Examples 1 and 2: Composition for Solid Core

Table 1 below shows compositions according to the present disclosure made for use in a solid core. As shown in Table 1, the ash residue is used in Examples 1 and 2 in an amount of 5 phr and 10 phr. Conventional fillers are used in Comparative Example 1.

TABLE 1

| Composition for Solid Core | | | |
|---|---|---|---|
| | Example 1 Core Composition (phr) | Example 2 Core Composition (phr) | Comparative Example 1 Core Composition (phr) |
| Base Rubber | | | |
| High cis-1,4 polybutadiene (Buna CB 1221) | 100 | 100 | 100 |
| High cis-1,4 polybutadiene (BUDENE ® 1207) | 0 | 0 | 0 |
| Cross-linking agent | | | |
| Zinc diacrylate (ZDA) | 30.5 | 30.5 | 30.5 |
| Free radical initiator | | | |
| Dicumyl peroxide (Perkadox ® BC) | 1 | 1 | 1 |
| Radical Scavenger | | | |
| Zinc pentachlorothiophenol (ZnPCTP) | 0.34 | 0.34 | 0.34 |
| Ash Residue | | | |
| 14% Metal | 5 | 10 | |

TABLE 1-continued

| | | | Comparative |
| Composition for Solid Core | | | |
| | Example 1 Core Composition (phr) | Example 2 Core Composition (phr) | Comparative Example 1 Core Composition (phr) |
|---|---|---|---|
| Fillers | | | |
| Zinc oxide (ZnO) | — | — | 5 |
| Regrind | — | — | 10 |
| Barium sulfate | — | — | 12.4 |

Example 3: Compositions for Dual Core

Table 2 below shows compositions for a dual core. As shown in Table 2, the ash residue used in the center and outer core layer is in an amount of 5 phr and 10 phr, respectively.

TABLE 2

| Compositions for Dual Core Golf Ball | | |
| | Example 3 | |
| | Center Composition (phr) | Outer Core Layer Composition (phr) |
|---|---|---|
| Base Rubber | | |
| High cis-1,4 polybutadiene (Buna CB 1221) | 100 | 0 |
| Ethylene-propylene-diene rubber (Dow Nordel ® IP 5565 EPDM) | 0 | 0 |
| High cis-1,4 polybutadiene (BUDENE ® 1207) | 0 | 81 |
| Styrene butadiene rubber (SBR 1502) | 0 | 19 |
| Cross-linking agent | | |
| Zinc diacrylate (ZDA) | 30.5 | 35.5 |
| Free radical initiator | | |
| Dicumyl peroxide (Perkadox ® BC) | 1 | 0.35 |
| Radical Scavenger | | |
| Zinc pentachlorothiophenol (ZnPCTP) | 0.34 | 0.71 |
| Ash Residue | | |
| 14% Metal | 5 | 10 |
| Fillers | | |
| Zinc oxide (ZnO) | — | 7 |
| Regrind | — | 14 |
| Barium sulfate | — | — |

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the method in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball, comprising:
a dual core comprising an outer core layer disposed over an inner core layer, wherein at least one of the outer core layer or the inner core layer is formed of a composition, the composition comprising:
a base rubber; and
about 2 to 15 percent organic-free ash residue by weight of the composition, wherein the ash residue comprises about 5 percent to about 30 percent by weight of metal compounds, and wherein the metal compounds comprise (1) zinc, barium, and titanium, (2) zinc, barium, and limestone, or (3) zinc, titanium, and limestone; and
a cover layer surrounding the dual core, wherein the cover layer comprises an ionomer, polyurethane, polyurea, polyurethane-urea hybrid, or copolymers and blends thereof.

2. The golf ball of claim 1, wherein the metal compounds comprise zinc, barium, and limestone or zinc, titanium, and limestone.

3. The golf ball of claim 1, wherein the metal compounds comprise zinc, barium, and limestone.

4. The golf ball of claim 1, wherein the ash residue is present in the composition in an amount of about 5 to 10 percent by weight of the composition.

5. The golf ball of claim 1, wherein the composition further comprises an organic peroxide, a cross-linking co-agent, a radical scavenger, or a combination thereof.

6. The golf ball of claim 5, wherein the co-agent comprises a zinc salt of an acrylate, diacrylate, methacrylate, or dimethacrylate.

7. The golf ball of claim 1, wherein the outer core layer is formed of the composition.

8. The golf ball of claim 1, wherein the base rubber comprises polybutadiene.

9. The golf ball of claim 1, wherein the at least one metal compound is present in the ash residue in an amount of about 10 to about 25 percent by weight of the ash residue.

10. The golf ball of claim 1, wherein the ash residue is golf ball waste ash residue.

11. A golf ball, comprising:
a core formed of a composition, the composition comprising:
a base rubber; and
organic-free ash residue present in the composition in an amount of about 1 to 20 percent by weight of the composition, wherein the ash residue metal comprises barium, and wherein the barium is present in the ash residue in an amount of about 12 to 20 percent by weight of the ash residue;
a cover layer; and
a layer disposed between the core and the cover, wherein the layer and cover each comprises an ionomer, polyurethane, polyurea, polyurethane-urea hybrid, or copolymers and blends thereof.

12. The golf ball of claim 11, wherein the ash residue further comprises limestone.

13. The golf ball of claim 11, wherein the ash residue further comprises zinc, titanium, or a combination thereof.

14. The golf ball of claim 11, wherein the ash residue is present in the composition in an amount of about 2 to 15 percent by weight of the composition.

15. A golf ball, comprising:
a core formed of a composition, the composition comprising:
a base rubber comprising polybutadiene, butyl rubber, or a combination thereof; and
organic-free ash residue present in the composition in an amount of about 7 to 18 percent by weight of the composition, wherein at least one metal compound is present in an amount of about 10 percent to about 25 percent based on the total weight of the ash residue, and wherein the at least one metal compound comprises barium, limestone, or a combination thereof; and
a cover layer.

16. The golf ball of claim 15, further comprising a layer disposed between the core and the cover, wherein the layer and cover each comprises an ionomer, polyurethane, polyurea, polyurethane-urea hybrid, or copolymers and blends thereof.

17. The golf ball of claim 15, wherein the at least one metal compound is present in the ash residue in an amount of about 13 to 15 percent by weight of the ash residue.

18. The golf ball of claim 15, wherein the at least one metal compound is present in the ash residue in an amount of about 12 to 20 percent by weight of the ash residue.

* * * * *